(12) United States Patent
Choudhery et al.

(10) Patent No.: US 8,093,334 B2
(45) Date of Patent: Jan. 10, 2012

(54) PROTECTIVE SEALABLE COATING COMPOSITIONS

(75) Inventors: Riaz Ahmad Choudhery, West Midlands (GB); David George James, West Midlands (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 247 days.

(21) Appl. No.: 12/598,786

(22) PCT Filed: Apr. 30, 2008

(86) PCT No.: PCT/EP2008/003519
§ 371 (c)(1),
(2), (4) Date: Nov. 4, 2009

(87) PCT Pub. No.: WO2008/135223
PCT Pub. Date: Nov. 13, 2008

(65) Prior Publication Data
US 2010/0062199 A1 Mar. 11, 2010

(30) Foreign Application Priority Data

May 4, 2007 (GB) .................................. 0708715.8

(51) Int. Cl.
*C08J 3/09* (2006.01)
*C09D 163/00* (2006.01)
*C09D 133/00* (2006.01)
*C09D 167/00* (2006.01)
*C09D 175/00* (2006.01)

(52) U.S. Cl. ........ 525/119; 525/120; 525/123; 525/165; 525/176; 525/221; 525/207; 525/208

(58) Field of Classification Search ................. 525/120, 525/123, 165, 176, 207, 208, 221
See application file for complete search history.

(56) References Cited

U.S. PATENT DOCUMENTS

| 3,375,300 | A |   | 3/1968  | Ropp        |         |
|-----------|---|---|---------|-------------|---------|
| 4,128,185 | A |   | 12/1978 | Wszolek     |         |
| 4,478,667 | A | * | 10/1984 | Fitko       | 156/307.3 |
| 5,326,822 | A |   | 7/1994  | Hesse et al. |         |
| 5,354,809 | A |   | 10/1994 | Hesse et al. |         |

FOREIGN PATENT DOCUMENTS

| EP | 0 034 841 | 9/1981  |
|----|-----------|---------|
| EP | 0 525 510 | 2/1993  |
| EP | 0 572 844 | 12/1993 |
| GB | 1 558 084 | 12/1979 |

* cited by examiner

*Primary Examiner* — Kelechi Egwim
(74) *Attorney, Agent, or Firm* — Kenyon & Kenyon LLP

(57) ABSTRACT

A dispersion of polymer microparticles in organic liquid, the polymer comprising the reaction product of i) from 2 to 40 parts by weight of a first polymer being polypropylene polymer having sufficient carboxylic acid and/or carboxylic acid anhydride groups equivalent to an acid value of from 2 to 50 mg KOH/g nv polymer and ii) from 60 to 98 parts by weight of a second polymer having a molar excess of functional groups capable of reacting with the carboxylic acid and/or carboxylic acid anhydride groups of the polypropylene polymer and wherein the organic liquid is chosen to be a good solvent for the second polymer and a poor solvent for the polypropylene polymer.

21 Claims, No Drawings

PROTECTIVE SEALABLE COATING COMPOSITIONS

This invention relates to polymer dispersions comprising modified polypropylene dispersions in organic carrier liquid, useful as coating compositions especially for use in heat seal applications for containers. There is also provided a process for making the dispersions.

Metal food and drink containers, for example cans and lidded trays, are usually coated on the inside to prevent reaction between the contents and the metal from which the can is formed. Such reaction leads both to unwanted deterioration of the can and also potentially damaging effects on the contents, particularly in terms of changes in quality and taste. Without an interior coating, most cans of food or drink would not remain usable for very long. The coating is often applied to the flat metal by roller coating before the can is formed and then dried and/or cured in a stoving operation. Typical oven temperatures used are about 200° C. for 6 to 12 minutes. The can is then formed from the flat metal by a drawing process before being filled with food or drink and finally sealed up.

The coatings are required to have very good flexibility, adhesion, sterilisation resistance, stability properties and blush resistance. Flexibility and adhesion are essential if the coating is to remain intact during the can formation process when the coated flat metal sheet is drawn into the form of the can. When the cans are filled with food, the contents are usually sterilised by heating the sealed can to temperatures of around 120° C. to 140° C. for 10 to 90 minutes (depending on the nature of the food).

The coating is then in direct contact with the contents of the can for a considerable period of time which can be many years. During sterilisation and subsequent storage, the coating is required to maintain its integrity so as to prevent corrosion of the metal can and to prevent metal migration into the can contents. Additionally, the coating must not impair the contents by releasing unwanted material or by altering the flavour or appearance. These resistance properties impact not only on the shelf life of the product but also on public health and safety. Thus, there are particularly stringent and specific requirements of coating compositions for can interiors which are different from those for other coatings.

In some applications the coating is also used to bond the lid to the container body. For example, pet food can be provided in a tray with a thin, full length aluminium lid. The lid is attached to the tray by means of a coating, usually crosslinked, which on application of heat and pressure forms an adhesive bond or seal between the lid and the tray. The contents are accessed by simply peeling back the flexible aluminium lid which in turn breaks the seal. The strength of the seal is very important as it must be strong enough to survive the manufacturing and filling process, yet not be so strong that breaking the seal becomes difficult.

U.S. Pat. No. 3,375,300 discloses primer compositions containing mixtures of maleic anhydride modified polypropylene and polyamide resins. However, modified polypropylene reacted with the polyamide are not disclosed and neither are dispersions of such materials. Similarly, U.S. Pat. No. 4,478,667 discloses solutions of mixtures of carboxylated polypropylene, crosslinker and butene polymer, rather than dispersions of particles containing carboxylated polypropylene reacted with either the crosslinker or the butene polymer.

Other known coating compositions useful in this application contain polypropylene. This is usually in the form of dispersions in organic liquids. However, the amount of polypropylene that can be incorporated into the coating is limited to less than 15%, calculated on a non vol weight basis, as the maximum workable solids at which the polypropylene dispersions can be made are themselves limited to about 17% wt/wt. This upper limit on solids is a result of the high viscosity of such dispersions, probably a consequence of the large mean particle size, which is typically approximately 10 μm.

Such dispersions have a number of major disadvantages. Firstly, both the dispersions themselves and coatings containing them are prone to forming hard, difficult to redisperse sediments. This results in significant problems in metal container production plants which must use high speed stirring in the bulk tanks used to store the coatings to counter the sedimentation. High circulation rates are also necessary to prevent sedimentation of the particles in the pipework of the circulating system. Whilst such strategies can overcome the problems, they are inconvenient, inevitably expensive, use increased amounts of energy and thus add unnecessarily to carbon dioxide emissions. Secondly, the typical coating thickness of the seal is from 3 to 9 μm. Thus, particles of average diameter of 10 μm will have a substantial population protruding beyond the surface. Whilst stoving the coating causes some flow of the polypropylene, it does not produce an evenly distributed layer and, rather, islands of polypropylene result. As it is the polypropylene that forms the seal, this unevenness in the distribution gives rise to poorer and variable seal strengths.

Accordingly, in a first aspect of the invention there is provided a dispersion of polymer microparticles in organic liquid, the polymer comprising the reaction product of i) from 2 to 40 parts by weight of a first polypropylene polymer having sufficient carboxylic acid and/or carboxylic acid anhydride groups equivalent to an acid value of from 2 to 50 mg KOH/g nv polymer and ii) from 60 to 98 parts by weight of a second polymer having a molar excess of functional groups capable of reacting with the carboxylic acid and/or carboxylic acid anhydride groups of the polypropylene polymer and wherein the organic liquid is chosen to be a good solvent for the second polymer and a poor solvent for the polypropylene polymer.

The word polymer is used herein to include homopolymers and copolymers having one, two or more types of repeating units.

Preferably, the dispersion has a non vol content of at least 15%, more preferably from 15 to 60%, even more preferably from 25 to 45% and most preferably from 30 to 40% calculated on a weight basis.

Particularly useful polypropylene polymers include propylene-maleic anhydride polymers, also known as maleinised polypropylene; and propylene-ethylene-maleic anhydride polymers.

Preferably the polypropylene polymer has a weight average molecular weight (Mw) of from 30,000 Daltons to 200,000 Daltons, more preferably from 40,000 to 150,000 Daltons, even more preferably from 45,000 to 130,000 Daltons and most preferably from 45,000 to 100,000 Daltons. Below about 30,000 Daltons the seal formed is weak, resulting in an increased risk of seal failure occurring. Above about 200,000, the polypropylene becomes difficult to process easily due to high melt viscosity, even in the very high shear conditions prevailing in an extruder.

The polypropylene polymer preferably carries sufficient carboxylic acid groups or carboxylic acid anhydride groups to give an acid value of from 2 to 50 mg KOH/g of non-vol polymer, preferably from 2 to 20 mg KOH/g and most preferably from 2 to 9 mg KOH/g. Below 2 mg KOH/g the quality of the dispersion is poor in that the particle size is coarse and the dispersion unstable, forming a sediment that cannot be easily redispersed. In addition, the adhesion to metal at such low AV is poor.

It is likely that, at acid values of 2 to 50 mg KOH/g of polymer, not all of the polypropylene polymer chains will carry carboxylic acid groups or carboxylic acid anhydride groups, especially at acid values below about 20 mg KOH/g. It is understood that such polymers will have a statistical mixture of polymers. It is thought that the portion of the polypropylene polymer that is free of carboxylic acid and carboxylic acid anhydride, being unreactive to the first polymer and insoluble in the organic liquid, will form the core portion of the microparticle. The reaction product forms the shell portion, surrounding the core acting as a stabiliser/dispersant for the microparticle.

Preferably the dispersion is free of added surfactant. By added is meant not formed in-situ.

The carboxylic acid anhydride groups are preferably unsaturated carboxylic acid anhydrides such as maleic anhydride. More preferably, the polypropylene polymer contains maleic anhydride in the polymer backbone.

When the dispersions of the invention are destined for uses which brings them into contact with food and beverages, it is preferable to keep the maleic anhydride level to 0.8% or below, calculated on the polypropylene copolymer. This equates to an AV of from 2 to 8 mg KOH/g polymer. This is compliant with the US Food and Drug Administration regulations.

The second polymer may be any polymer carrying functional groups capable of reacting with the carboxylic acid groups or carboxylic acid anhydride groups of the polypropylene polymer. More preferred are polymers useful in forming protective coatings for metal containers especially cans for food and beverages. Suitable examples include epoxy resins, especially diepoxy resin, preferably derived from his phenol A diglycidyl ether (often referred to as BADGE); phenoxy resins, epoxidised oils and polymers such as epoxidised soya bean oil or epoxidised polybutadiene; and polyester resins, alkyd resins, acrylic resins and polyurethane resins. Even more preferred are epoxy resins based on BADGE and most preferred are epoxy resins based on BADGE of EEW from 450 to 4500.

Preferably, the microparticles are free of butene polymer.

Suitable examples of functional groups on the second polymer include oxirane, hydroxyl, amine and isocyanate. Oxirane and hydroxyl are preferred as these are suitable for use in coatings in contact with food and beverages.

Additional polymers may be included. In a second aspect of the invention, a third polymer is included in the mixture of step i). Generally, such a polymer is chosen to modify the seal strength of a heat sealable composition based on the resulting dispersion.

It is found that, for some formulations, the strength of the seals provided by the microparticles of the invention can be too high. In such circumstances, the additional polymer is selected to deliberately reduce the seal strength. Suitable such polymers can be selected from the list consisting of ethylene vinyl acetate, ethylene ethyl acrylate, ethylene isobutyl acrylate, vinyl chloride and copolymers of vinyl chloride, chlorinated polypropylene, ethylene-propylene copolymers, ethylene-propylene-diene copolymers also known as EPDM rubbers, butyl rubber, chlorinated rubber, styrene block copolymers sold as Kraton™, polybutadienes, butadiene-styrene copolymers, polyvinyl butyral and polyvinyl stearate.

The functional groups of the second polymer are in molar excess over the carboxylic acid and/or carboxylic acid anhydride groups of the polypropylene polymer so that, preferably, at least some of the functional groups of the second polymer are available to react with crosslinking resins. Even more preferably there is a molar excess of second polymer over the polypropylene polymer. Yet more preferably the excess of second polymer is dissolved in the organic liquid.

It is thought that at least some of the carboxylic acid groups and/or carboxylic acid anhydride groups react with the functional groups of the second polymer to form, in situ, a dispersant capable of dispersing the copolymer microparticles. For example, where the second polymer is an epoxy resin, the carboxylic acid groups and/or carboxylic acid anhydride groups from the polypropylene polymer react with the hydroxyl groups and/or the oxirane groups of the epoxy resin to form an ester which acts to stabilise the particles. In this way dispersions can be made which are free of added dispersant. Preferably, all of the carboxylic acid/or carboxylic acid anhydride groups react with the functional groups on the second polymer.

It is thought that the particles have a core-shell type structure with the core being composed predominantly of polypropylene carrying no carboxylic acid or carboxylic acid anhydride groups, whilst the shell, which surrounds the core, is predominantly composed of the stabiliser/dispersant formed by the reaction of the second polymer with the polypropylene having carboxylic acid or carboxylic acid anhydride groups.

Most of the second polymer is thought to be dissolved in the organic liquid forming the continuous phase of the dispersion.

Preferably the microparticles have a core-shell structure with the core comprising a polypropylene polymer portion free of carboxylic acid or carboxylic anhydride groups and a shell comprising the reaction product of the first and second polymer. More preferably, the reaction product is a dispersant capable of stabilising the microparticles of the dispersion.

Preferably the particles of the dispersion have a mean diameter of from 0.5 to 20 microns, more preferably from 2 to 15 microns and most preferably from 3 to 10 microns.

The ratio of the second polymer to the first polypropylene polymer is preferably from 98:2 to 60:40, more preferably from 95:5 to 60:40, yet more preferably from 93:7 to 50:50, even more preferably from 93:7 to 60:40 and most preferably from 90:10 to 70:30.

The organic liquid is chosen such that the second polymer is substantially soluble in the liquid and the polypropylene polymer is substantially insoluble in the liquid, in particular at temperatures of about 15 to 50° C., the typical temperature that the dispersion will be exposed to on storage, transportation or in use. This ensures that the polymer microparticles are composed substantially of polypropylene polymer whilst the second polymer is dissolved in the organic liquid. This has the added benefit that any dispersant produced by the reaction of the carboxylic acid groups and/or the carboxylic acid anhydride groups of the polypropylene polymer with the functional groups of the second polymer are anchored to the particles and thus the dispersion has reduced tendency to form sediment.

Suitable such liquids include alcohols, such as butanol; ether alcohols, such as 2-butoxy ethanol; ester solvents, such as 1-methoxy 2-propanol acetate; ketones, such as cyclohexanone and aromatics, such as xylene.

In a second aspect of the invention there is provided a process for the manufacture of the dispersion comprising the steps of i) providing a mixture comprising from 2 to 40 parts by weight of a first polypropylene polymer having sufficient carboxylic acid and/or carboxylic acid anhydride groups equivalent to an acid value of from 2 to 50 mg KOH/g nv polymer and from 60 to 98 parts by weight of a second polymer having a molar excess of functional groups capable of reacting with the carboxylic acid and/or carboxylic acid anhydride groups of the polypropylene ii) causing the polymers to melt at a chosen temperature under conditions of high shear, preferably in an extruder, to form an intimate mixture of the polymers iii) causing the carboxylic acid and/or carboxylic acid anhydride groups of the polypropylene to react with at least some of the functional groups of the second polymer, under conditions of high shear preferably in an extruder iv) diluting the resulting mixture of step iii) with an organic liquid at a temperature such that a substantially homogeneous solution is formed v) cooling the solution to a temperature whereby the polymer microparticles of the dispersion are formed.

Preferably all of the steps are carried out in an extruder as this allows more efficient heat exchange and thus more rapid heating and cooling as necessary. More preferably a twin screw extruder with co-rotating screws is used, for example, a Leistritz micro 18 GL 40 D is used.

Where an extruder is used, it is preferably arranged to have four zones, namely a conveying zone operating at about room temperature, a melt/blending zone operating at from 120 to 300° C., a dilution zone also operating at from 120 to 300° C. and a cooling zone operating below the temperature of the dilution zone and preferably at a temperature at which the particles form.

The first zone is the polymer feed zone where a coarse blend of the polypropylene polymer and the first polymer are fed in at ambient temperature, typically between 20 and 25° C. The screw profile in this zone comprises conveying screw elements to transport the mixture to the second zone, the melt blending/reaction zone.

In the melt blending/reaction zone the contents of the extruder barrel should be maintained at a temperature above the softening point of the polymers contained therein and more preferably at a temperature which is also high enough that at least some of the carboxylic acid groups and/or the carboxylic acid anhydride groups can react with the functional groups of the first polymer. Preferably the temperature is from 120 to 300° C., more preferably from 150 to 290° C. and most preferably from 160 to 260° C. The screw profile here has kneading elements which impart sufficiently high shear to form an intimate blend of the two polymers at the chosen temperature and to preferably ensure that the aforementioned reaction proceeds. The screw profile in this region also has conveying screw elements to transport the mixture to the next zone, the dilution zone.

In the dilution zone the organic liquid that forms the continuous phase of the dispersion is added. The screw profile in this zone may be the same as used in the melt blending/reaction zone. The temperature in this zone is selected so that the mixture of step iii) is substantially dissolved in the chosen organic liquid.

The polymer solution of the dilution zone is transported to a cooling zone where the dispersion is cooled sufficiently to allow the polymer microparticles of the dispersion to form. Suitable temperatures will vary according to the solvent(s) and polymer chosen. Nevertheless, appropriate temperatures may be determined by routine experiment. The resulting dispersion can be collected in a suitable receiving vessel. The screw profile in this region comprises conveying and optionally kneading elements.

The screw speed is preferably from 50 to 600 rpm, more preferably from 200 to 600 rpm, even more preferably from 300 to 600 rpm, still more preferably from 400 to 600 rpm and most preferably about 500 rpm.

It is difficult to calculate a value for the shear rate in an extruder that has a screw profile which varies along the along the length of the screw. However, a qualitative indicator of shear rate is provided by the combination of screw profile and screw speed as described above.

In another aspect of the invention there is provided a coating composition comprising the dispersions of polymer particles according to the invention as hereinbefore described. Preferably the coating composition further comprises ingredients selected from the list consisting of flow additives, antifoams, thickeners, plasticizers, catalysts—especially catalysts promoting crosslinking reactions.

Preferably the composition is crosslinkable with crosslinking resins. Suitable crosslinking resins must be selected according to the functional groups on either or both of the first and second resins. Suitable crosslinking resins include amino resins such as melamine-formaldehyde resins, urea-formaldehyde resins, phenol formaldehyde resin, benzoguanamine resins; acid functional resins such as polyesters—for example selected from the Uralac P range available from DSM Resins BV, acrylics of acid value greater than 30 mg KOH/g—for example selected from the Elvacite range available from Lucite International; anhydrides, for example trimellitic anhydride and pyromellitic dianhydride; blocked and unblocked isocyanates such as those based on isopherone diisocyanate, toluene diisocyanate and methane diphenyl diisocyanate available from Bayer; polyphenols and polyamines. Preferred crosslinking resins are capable of reacting with the first polymer. Suitable examples of crosslinking resins include Cymel 303, Phenodur 285.

Preferably, the coating composition is free of added butene polymers.

In yet another aspect of the invention there is provided metal sheet, a metal lid and/or a metal container coated with a coating of the invention.

Examples of the invention will now be described.

Ingredients Used in the Examples

DER 669-20 is a diepoxy resin and is available from Dow Chemical Company. FusaBond M613-05 is polypropylene functionalised with maleic anhydride and is available from DuPont.

Evatane 18-150 is an ethylene vinyl acetate (EVA) copolymer and is available from the Arkema Group.

Morprime 78LJ10A is a 15% solids dispersion of polypropylene functionalised with maleic anhydride, in aliphatic hydrocarbon solvent and is available from Rohm & Haas.

Phenodur 285 is an unplasticised phenolic crosslinking resin available from Surface Specialties Cycat 600 is an organic acid catalyst and is available from Cytec Industries Irganox 1010 is a phenolic antioxidant and is available from Ciba Dynapol L651 is a linear polyester of Tg 40C having a hydroxyl value and acid value of 8 and 4 mg KOH/g respectively and available from Degussa.

Cymel 303 is hexamethoxy methyl melamine crosslinking agent available from Cytec Industries.

Isopar P is mixture of aliphatic hydrocarbons having a boiling range of from 234 to 269° C. and is available from ExxonMobil Chemical.

Dowanol PMA is propylene glycol monomethyl ether acetate and is available from Dow Chemical Company.

Solvesso 100 is a mixture of C9 and C10 di-alkyl and tri-alkyl benzenes available from ExxonMobil Chemical.

Tests

Particle Size Measurement

A Malvern Mastersizer was used to measure the mean particle diameter.

Seals and Seal Strength

The heat sealable compositions were applied to one side of lids made from 100 μm thickness aluminium foil at a coating weight of 3 to 5 grams per square metre and heated in a box oven at an air temperature of 250° C. for 22 seconds to cure the coating. A seal was produced between two lids by pinching the lids (the coated surfaces in contact with each other) together for 1 second between heated jaws using a pressure of 5 bar and a temperature of 200° C. The jaws are of smaller dimensions than the lids and thus produce a seal also smaller than the lids, leaving the two lids bonded together by a seal strip and free un-bonded ends. The lids were cut into 4 strips, each 15 mm wide. The free ends of each strip were attached to the jaws of an Instron 1011 tensometer and the force required to peel apart each bonded strip was measured. The average of at least four measurements was taken. The peel angle was 180°. A peel rate of 100 mm/min was used.

EXAMPLES

Example 1

A twin screw extruder (Leistritz micro 18 GL 40 D available from Leistritz Aktiengesellschaft, Nurenberg)) was used having two screws rotating in the same direction at a speed of 500 rpm. The extruder barrel was divided into four zones with, in sequence, a feed zone maintained at ambient temperature of about 22° C., a melt blending/reaction zone at 170° C. and a dilution zone also maintained at 170° C., downstream of which was a cooling zone maintained at 110° C.

The screw profile in the feed zone consisted of conveying screw elements. In the melt blending/reaction zone and the dilution zone, the screw profile consisted of kneading screw elements and conveying screw elements. In the cooling zone the screw profile consisted of conveying screw elements alone.

A mixture of 90 parts by weight epoxy (DER 669-20) and 10 parts maleinsed polypropylene (FusaBond M613-05) was metered into the intake of the feed zone of the extruder at a rate 1.4 kg/hour. The mixture was conveyed to the melt blending/reaction zone where it melted and was formed into an intimate mixture under the high shear conditions of the extruder. Downstream of the melt blending/reaction zone, in the dilution zone, an organic liquid, butyl glycol ether was metered in at a rate of 2.4 kg/hour causing the molten resin to dissolve in the liquid. The resulting solution then passed to the cooling zone in which the particles formed after which the final dispersion exited at 110° C. and was collected in a receiving vessel.

The dispersion had non-volatile (nv) solids content of 36.4 wt % and was storage stable over a period 14 days with no evidence of sedimentation. The mean particle size of the dispersion was measured as 0.7 μm.

Example 2

The method and ingredients of example 1 were used with an epoxy resin to polypropylene resin ratio of 80:20.

The dispersion had nv solids content of 34.8 wt % and was storage stable over a period 14 days with no evidence of sedimentation. The mean particle size of the dispersion was measured as 1.2 μm.

Example 3

The method and ingredients of example 1 were used with an epoxy resin to polypropylene resin ratio of 70:30.

The dispersion had nv solids content of 35.7 wt % and was storage stable over a period 14 days with no evidence of sedimentation. The mean particle size of the dispersion was measured as 2.4 μm Example 4

The method and ingredients of example 1 were used with an epoxy resin to polypropylene resin ratio of 60:40.

The dispersion had nv solids content of 35.1 wt % and was storage stable over a period 14 days with no evidence of sedimentation. The mean particle size of the dispersion was measured as 3.0 μm Comparative Example C1

A 50 wt % solids solution of epoxy resin (DER 559-20) in butyl cellosolve was prepared in a 1 litre round bottomed flask fitted with an anchor stirrer. To this solution was added sufficient Morprime 78LJ10A dispersion to give a solids ratio of 90 parts epoxy resin to 10 parts maleinised polypropylene resin. The mixture was stirred at 2000 rpm for 30 minutes at room temperature of about 22° C.

The dispersion was adjusted to give a nv solids content of 36.4 wt % and showed signs of sedimentation within 3 days which could not be readily redispersed. The mean particle size of the dispersion was measured as 3.7 μm.

Comparative Example C2

The method and ingredients of example C1 were used at an epoxy resin to polypropylene resin ratio of 80:20. A dispersion could not be formed.

Heat Sealable Compositions

The Dispersions of the examples 1 and C1 were formulated into heat sealable compositions according to the recipe of Table 1. The ingredients were cold blended. All the compositions were adjusted with Dowanol PMA to give a final solids content of 27 wt %

TABLE 1

|  | parts by wt |
| --- | --- |
| Example 1, 2 or C1 | 80.000 |
| Phenodur 285 | 20.000 |
| Cycat 600 | 0.250 |
| Irganox 1010 | 0.478 |
| Isopar P | 5.000 |
| Dowanol PMA | As required to achieve 27 wt % nv |

The seals were formed and the seal strengths measured according to the methods described above. The results are shown in Table 2.

TABLE 2

| Example | Epoxy[1] wt % | Polypropylene A[2] | B[3] | Process | Particle size μm | Dispersion | Seal strength[4] Newtons |
|---|---|---|---|---|---|---|---|
| 1 | 90 | 10 | — | Extruder | 0.7 | Stable | 27-28 |
| 2 | 80 | 20 | — | Extruder | 1.2 | Stable | — |
| 3 | 70 | 30 | — | Extruder | 2.4 | Stable | — |
| 4 | 60 | 40 | — | Extruder | 3.0 | Stable | — |
| C1 | 90 | — | 10 | Cold blend | 3.7 | Sedimented | 4-5 |
| C2 | 80 | — | 20 | Cold blend | Flocculated | — | — |

[1]DER 669-20: Diepoxy resin
[2]Fusabond M613-05: Polypropylene functionalised with maleic anhydride
[3]Morprime 78LJ10A: Dispersion of polypropylene functionalised with maleic anhydride
[4]Of heat sealable compositions

Example 5

The same twin screw extruder as in example 1 was used with the screws rotating in the same direction at a speed of 500 rpm. The extruder barrel was divided into differing temperature zones as in example 1, other than the melt blending/reaction zone was at 260° C.

A dry mixture containing 85 parts by weight polyester (Dynapol L651) and 15 parts maleinised polypropylene (FusaBond M613-05) was metered into the intake of the feed zone of the extruder at a rate 1.6 kg/hour. The dry mixture was mixed and melted in the melt blending/reaction zone. Downstream of the melt blending/reaction zone an organic liquid consisting of a mixture of Dowanol PMA and Solvesso 100 (3:1 by weight) was metered in at a rate of 3.2 kg/hour. The resulting dispersion passed to the cooling zone after which the final dispersion exited at 125° C. and was collected in a receiving vessel.

The dispersion had nv solids content of 34.9 wt % and was storage stable 7 days with some evidence of sedimentation. The sediment was easily redispersed. The mean particle size of the dispersion was measured as 3.0 μm

Example 6

The method and ingredients of example 5 was used except that the polyester resin to polypropylene resin ratio was 70:30.

The dispersion had nv solids content of 32.9 wt % and was storage stable over a period 14 days with some evidence of sedimentation. The sediment was easily redispersed by stirring. The mean particle size of the dispersion was measured as 6.1 μm

Comparative Example C3

A 50 wt % solids solution of polyester resin (Dynapol L651) in a 3:1 mixture of Dowanol PMA and Solvesso 100 was prepared. To this solution was added sufficient Morprime 78LJ10C dispersion to give a solids ratio of 85 parts epoxy resin to 15 parts maleinised polypropylene resin. The mixture was stirred at 2000 rpm for 30 minutes at room temperature of about 22° C.

The dispersion had nv solids content of 36.4 wt % and showed signs of sedimentation within 2 days and could not be easily redispersed. The mean particle size of the dispersion was measured as 4.1 μm.

Comparative Example C4

The method and ingredients of example C3 were used at a polyester resin to polypropylene resin ratio of 70:30. A dispersion could not be formed.

Heat Sealable Compositions

The Dispersions of the examples 5, 6 and C3 were formulated into heat sealable compositions according to the recipe of Table 1. The ingredients were cold blended. All the compositions were adjusted with Dowanol PMA/Solvesso 100 (1:1) to give a final solids content of 27 wt %.

| | parts by wt |
|---|---|
| Example 5, 6 or C3 | 80.000 |
| Cymel 303 | 20.000 |
| Cycat 600 | 0.250 |
| Irganox 1010 | 0.478 |
| Isopar P | 5.000 |
| Dowanol PMA/Solvesso 100 | As required to achieve 27 wt % nv |

The results are shown in Table 3

Example 7

The method of Example 1 was used. The ingredients were also the same as in Example 1 except that a third polymer, Evatane 18-150 was included in the mixture fed into the intake of the feed zone of the extruder. The ratio of the epoxy, polypropylene and Evatane 18-150 was 83:14.4:2.6 respectively.

The dispersion was storage stable for 14 days with some sign of sedimentation which was easily redispersed.

TABLE 3

| Example | Polyester[1] wt % | Polypropylene A[2] | B[3] | Process | Particle size μm | Dispersion | Seal strength[4] Newtons |
|---|---|---|---|---|---|---|---|
| 5 | 85 | 15 | — | Extruder | 3.0 | Stable | 15-17 |
| 6 | 70 | 30 | — | Extruder | 4.4 | Stable | 26-28 |

TABLE 3-continued

| Example | Polyester[1] wt % | Polypropylene A[2] | Polypropylene B[3] | Process | Particle size μm | Dispersion | Seal strength[4] Newtons |
|---------|-------------------|-----|-----|-----------|-----|------------------------|-------|
| C3 | 85 | — | 15 | Cold blend | 4.1 | Sedimented | 13-15 |
| C4 | 70 | — | 30 | Cold blend | — | Did not form dispersion | — |

[1]Dynapol L651 polyester resin
[2]Fusabond M613-05: Polypropylene functionalised with maleic anhydride
[3]Morprime 78LJ10A: Dispersion of polypropylene functionalised with maleic anhydride
[4]Of heat sealable compositions

The invention claimed is:

1. A dispersion of polymer microparticles in organic liquid, the polymer comprising the reaction product of
   i) from 2 to 40 parts by weight of a first polymer being polypropylene polymer having sufficient carboxylic acid and/or carboxylic acid anhydride groups equivalent to an acid value of from 2 to 50 mg KOH/g nv polymer and
   ii) from 60 to 98 parts by weight of a second polymer having a molar excess of functional groups capable of reacting with the carboxylic acid and/or carboxylic acid anhydride groups of the polypropylene polymer
wherein the organic liquid is chosen to be a good solvent for the second polymer and a poor solvent for the polypropylene polymer.

2. The dispersion of polymer microparticles according to claim 1 wherein the second polymer is in molar excess over the polypropylene polymer.

3. The dispersion of polymer microparticles according to claim 2 wherein the unreacted molar excess of the second polymer is dissolved in the organic liquid.

4. The dispersion of polymer microparticles according to claim 1 wherein the functional groups of the second polymer are oxirane and/or hydroxyl.

5. The dispersion of polymer microparticles according to claim 1 wherein the second polymer is an epoxy resin, an acrylic resin, a polyurethane resin or a polyester resin.

6. The dispersion of polymer microparticles according to claim 1 wherein the polypropylene polymer contains maleic anhydride in the polymer backbone.

7. The dispersion of polymer microparticles according to claim 1 wherein the carboxylic acid groups and/or carboxylic acid anhydride groups of the polypropylene polymer react with the functional groups of the second polymer to form a dispersant capable of stabilising the polymer microparticles.

8. The dispersion of polymer microparticles according to claim 1 wherein at least some of the functional groups of the second polymer are available for crosslinking.

9. The dispersion of polymer microparticles according to claim 1 wherein the molecular weight of the polypropylene polymer is from 30,000 to 200,000 Daltons.

10. The dispersion of polymer microparticles according to claim 1 wherein the microparticles are free of butene polymer.

11. The dispersion of polymer microparticles according to claim 1 wherein the organic liquid is chosen such that the second polymer is substantially soluble in the liquid and the polypropylene copolymer is substantially insoluble at temperatures of 15 to 50° C.

12. A coating composition comprising the dispersion of polymer microparticles according to claim 1.

13. The coating composition according to claim 12 further comprising crosslinking resin.

14. The coating composition according to claim 12 wherein the coating composition is free of butene polymer.

15. The coating composition according to claim 13 wherein the coating composition is free of butane polymer.

16. A metal sheet, a metal lid and/or a metal container coated with a coating composition according to claim 12.

17. A process for the manufacture of a dispersion of polymer microparticles in organic liquid, comprising the steps of
   i) providing a mixture comprising from 2 to 40 parts by weight of a first polypropylene polymer having sufficient carboxylic acid and/or carboxylic acid anhydride groups equivalent to an acid value of from 2 to 50 mg KOH/g nv polymer and from 60 to 98 parts by weight of a second polymer having a molar excess of functional groups capable of reacting with the carboxylic acid and/or carboxylic acid anhydride groups of the polypropylene
   ii) causing the polymers to melt at a chosen temperature under conditions of high shear to form an intimate mixture of the polymers
   iii) causing the carboxylic acid and/or carboxylic acid anhydride groups of the polypropylene to react with at least some of the functional groups of the second polymer, under conditions of high shear
   iv) diluting the resulting mixture of step iii) with an organic liquid at a temperature such that a substantially homogeneous solution is formed
   v) cooling the solution to a temperature whereby the polymer microparticles of the dispersion are formed.

18. The process according to claim 17 wherein all of the steps are performed in an extruder.

19. The process according to claim 18 wherein the extruder is divided into a conveying zone operating at about room temperature, a melt/blending zone operating at from 120 to 300° C., a dilution zone also operating at from 120 to 300° C. and a cooling zone operating below the temperature of the dilution zone.

20. The dispersion of polymer microparticles according to claim 5 wherein the second polymer is an epoxy resin derived from bis phenol A diglycidyl ether.

21. The process according to claim 17 wherein the steps ii) and iii) are performed in an extruder.

* * * * *